Nov. 12, 1957  R. W. TACCONE  2,812,560
REMOVABLE DIAPHRAGM FRAME
Filed Aug. 25, 1955  2 Sheets-Sheet 1

INVENTOR.
Russell W. Taccone
BY
Charles L. Lovercheck
atty

Nov. 12, 1957  R. W. TACCONE  2,812,560
REMOVABLE DIAPHRAGM FRAME

Filed Aug. 25, 1955  2 Sheets-Sheet 2

INVENTOR.
Russell W. Taccone
BY
Charles L. Lovercheck
atty.

United States Patent Office 2,812,560
Patented Nov. 12, 1957

2,812,560

REMOVABLE DIAPHRAGM FRAME

Russell W. Taccone, Erie, Pa., assignor to Taccone Pneumatic Foundry Equipment Corporation, North East Township, Pa., a corporation of Pennsylvania Application August 25, 1955, Serial No. 530,493

4 Claims. (Cl. 22—46)

This invention relates to molding machines and more particularly to diaphragm molding machines.

This application is a continuation in part of application, Serial No. 280,223, filed April 3, 1952, now Patent No. 2,715,758, granted August 23, 1955.

In molding machines using an air compressed diaphragm, the diaphragm will occasionally become damaged in use and the diaphragms which are inadvertently injured must be replaced. A considerable amount of time is required for the replacement of the diaphragm connected in a conventional way and the machine on which the diaphragm is used must be inoperative during this period of time.

It is, accordingly, an object of this invention to provide a molding machine wherein the diaphragm can be replaced on the machine in a very short time and the machine need be inoperative only a minimum length of time during the replacement of the diaphragm.

Another object of this invention is to provide a new type of diaphragm support in a diaphragm molding machine.

Another object of the invention is to provide a combination diaphragm and tank therefor which may be readily removed from a molding machine as a unit and replaced by a similar unit.

A further object of this invention is to provide a molding machine which is simple in construction, economical in manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
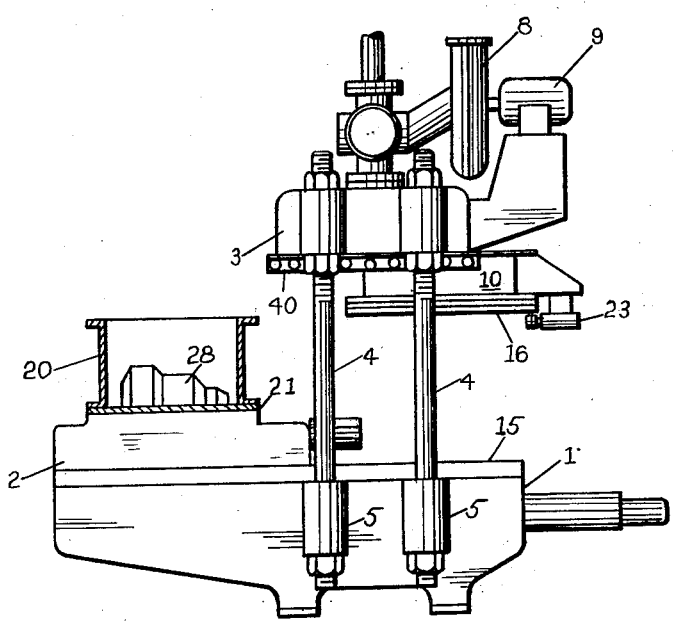
Fig. 1 is a side view of a diaphragm molding machine according to the invention showing the diaphragm partially removed.
Figure 4:
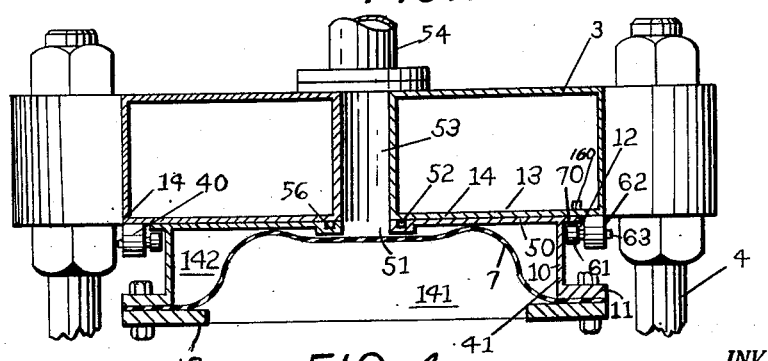
Fig. 4 is a cross sectional view taken on line 4—4 of Fig. 2.
Figure 3:
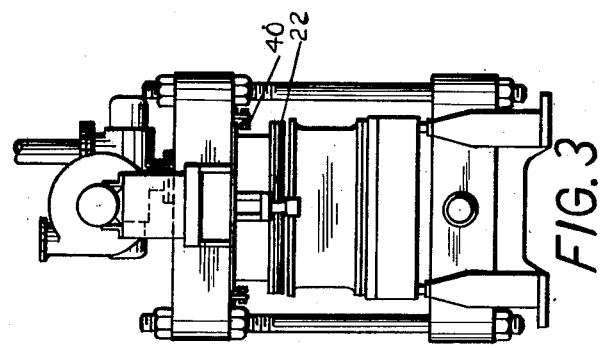
Fig. 3 is an end view of the machine shown in Fig. 2.

Now with more specific reference to the drawings, a machine is shown having a base 1 supporting a mold support 2 which is adapted to move along a track 15 into place under a head 3 of the molding machine and to be clamped thereto. The head 3 is supported by means of columns 4 which are supported in brackets 5 integrally attached to the base 1.

The head 3 has roller supports 61 which form roller tracks 40 attached along the outer part of each edge thereof which support a tank 41 having a flexible diaphragm 7 attached to its downwardly extending sides 10.

The tank 41 has a cavity 141 therein and the diaphragm 7 is adapted to be drawn into it by means of a vacuum pump 8. The pump 8 is driven by a motor 9. Compressed air is admitted through a pipe 54 into a concave cavity 142 behind the diaphragm 7 at predetermined intervals and drives the diaphragm 7 out of the cavity 141 and into engagement with molding material in a mold box 20. The tank 41 has the side frame 10 made of angle iron having flanges 11 on the lower edge thereof and a plate 50 is welded to the top of the angle and forms a top closure for the tank 41. The plate 50 overhangs the angle at 70 to form the track 40 for the rollers 61 and the track 40 is adapted to be received in a space 12 between the rollers 61 which are supported on a bracket 62 by an axle 63. The bracket 62 is welded to a plate 13 which is welded to the head 3 at 14.

When it is necessary to replace the diaphragm 7, the vacuum is released and the diaphragm 7 will sag down out of the cavity 141 with its marginal edges fixed to the marginal edges of the cavity 142. The clamping mechanism which clamps the tank 41 in place is then released. The frame 10 can be pulled outward over the rollers 61 through the position shown in Fig. 1 and, from there, can be pulled completely out from under the head 3 and a new tank having a new diaphragm attached thereto can be rolled into place under the head 3 with its frame supported on wheel 6 and, thereby, be put into working position.

Figure 2:
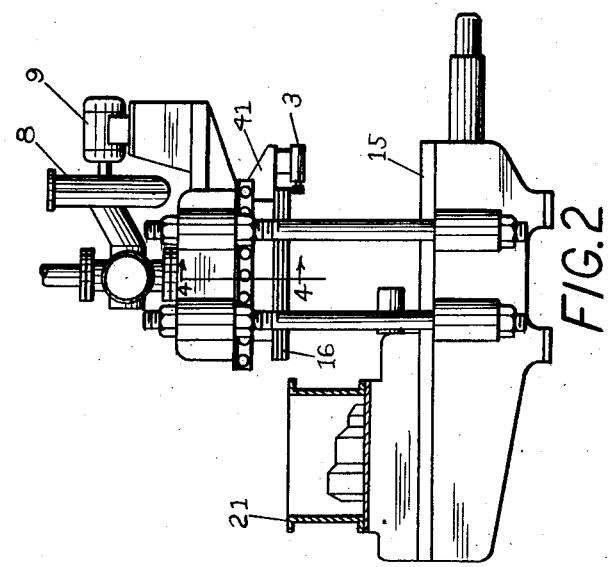
Fig. 2 is a side view of the diaphragm molding machine with the diaphragm support moved to an operative position.

The tank 41 is moved to the position shown in Fig. 2 and locked in this position by bolts 160 and the bolts 160 can extend through holes in the plate 13 and in the flange 70. The distance between the track 15 of the base support 1 whereon the mold support 2 is moved and the bottom surface 16 of the diaphragm frame 18 is only slightly greater than the distance between the upper surface 21 of the mold support 2 plus the vertical dimension of the mold box 20 and the bottom surface 16; that is, there will be a clearance gap between the upper edge of the mold box 20 and the lower surface of the diaphragm frame 18 to allow the car with the mold thereon to move freely under the head 3. The magnitude of this gap will be controlled to less than twice the thickness of the diaphragm 7. Therefore, a gap 22 remains between the top of the mold box 20 and the bottom of the diaphragm support 18 to provide for the free movement of the mold box 20 into place under the diaphragm support 18. The top plate 50 of the tank 41 has a central opening 51 therein and a groove 56 extends around the opening 51 which receives an O-shaped packing washer 52. A passage 53 is formed through the head 3 and communicates with the pipe 54 and the inside of the tank 41 and the O-shaped washer 52 forms a seal against leakage of air between the plate 50 and plate 13 of the head 3.

The mold box 20, when in operation is filled with sand and moved to a position under the head 3. When the car carrying the mold box 20 reaches the proper position, it comes into engagement with and is stopped by a buffer 23. Then the vacuum pump 8 is shut off and a pressure applied to the cavity 142 above the diaphragm 7 through the pipe 54. This forces the diaphragm 7 into engagement with the sand and packs the sand into firm engagement around pattern 28. The mold box 20 can then be moved to the position shown in Fig. 1 and the mold support 2 with the mold therein stripped off of the pattern 28, thereby providing a mold which can be set into position with a mold forming a supplementary part of the pattern 28. The mold boxes can then be clamped together and metal poured therein in the conventional manner.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a base, a head supported in fixed spaced relation to said base, a frame having a downwardly opening cavity therein and having outwardly extending flanges on two opposite sides, means on said head to slidably support said frame, said flanges adapted to be received on said supporting means whereby said frame is removably supported on said head, a flexible diaphragm secured at its marginal edges to said frame and forming a closure for one side thereof, and means to hold said frame in sealing engagement with said head whereby a chamber is formed above said diaphragm adapted to receive air under pressure between said diaphragm and said head, said base adapted to support a mold containing molding material in spaced relation to said head whereby air pressure exerted in the cavity behind said diaphragm forces said diaphragm to exert a pressure on said molding material whereby said molding material is packed in said mold.

2. A molding machine comprising a base having a support for a mold box thereon, a head supported above said base, a tank having sides and a top comprising an open bottomed cavity, means to attach the marginal edges of a sheet like diaphragm to the marginal edges of said cavity, a passage for air through said head, an opening in the top of said tank adapted to register with said opening in said head, sealing means between said head and said tank around said opening whereby gas may be directed through said opening into said tank, means to slidably support said tank on said head whereby said tank may be removed from said head to replace said tank and said diaphragm, and means to apply a suction through said opening to said cavity whereby said diaphragm may be driven thereinto, means being provided to apply a pressure in said tank through said opening to said diaphragm whereby said diaphragm is forced into engagement with molding material adapted to be disposed in said mold box on said support.

3. The machine recited in claim 2 wherein said means to slidably support said tank on said head comprises outwardly extending track members on opposed sides of said tank and roller members on said head adapted to support said track members.

4. A molding machine comprising a base having a track thereon, a car adapted to be supported on said track, a head supported above said track, said head having spaced rollers thereon, said car adapted to be moved on said track under said head into molding position and out from under said track to loading position, said head having a diaphragm tank supported thereon, said diaphragm tank comprising sides, each side made of a channel member having flanges disposed outwardly therefrom, a plate like cover for said tank, the upper flanges of said channels being adapted to be supported on said rollers attached to brackets extending downwardly from said head, a flexible diaphragm with its marginal edges lying over said lower flanges and having a frame clamping said diaphragm to said lower flanges, an opening through said head registering with an opening in the top of said diaphragm tank, an O-shaped washer disposed in a groove around said opening in said tank and adapted to engage said head forming a seal therebetween, means communicating with said opening through said head into said tank for applying a vacuum into said tank whereby said diaphragm is adapted to be pulled up into said tank, and means to apply a pressure through said opening to said diaphragm whereby said diaphragm is pushed downwardly from said tank and into molding engagement with molding material adapted to be disposed in a mold box supported on said car, said diaphragm tank being adapted to be pulled over said rollers on said head and out from under said head whereby it may be replaced by another said diaphragm.

References Cited in the file of this patent

UNITED STATES PATENTS

| | | |
|---|---|---|
| 318,784 | Moore | May 26, 1885 |
| 2,632,215 | Lee | Mar. 24, 1953 |
| 2,686,345 | Young | Aug. 17, 1954 |

FOREIGN PATENTS

| | | |
|---|---|---|
| 358,830 | Great Britain | Oct. 15, 1931 |